United States Patent [19]

Oikawa

[11] Patent Number: 5,617,219
[45] Date of Patent: Apr. 1, 1997

[54] APPARATUS AND METHOD FOR DATA COMPRESSION AND EXPANSION USING HYBRID EQUAL LENGTH CODING AND UNEQUAL LENGTH CODING

[75] Inventor: Yoshiaki Oikawa, Kanagawa, Japan

[73] Assignee: Sony Corporation, Japan

[21] Appl. No.: 486,316

[22] Filed: Jun. 7, 1995

Related U.S. Application Data

[63] Continuation of Ser. No. 222,574, Apr. 4, 1994, which is a continuation of Ser. No. 937,968, Aug. 28, 1992, abandoned.

[30] Foreign Application Priority Data

Aug. 29, 1991 [JP] Japan ................................ 3-244522
Aug. 30, 1991 [JP] Japan ................................ 3-244847

[51] Int. Cl.⁶ .............................. H04N 5/76; H04N 7/12; G11B 5/00
[52] U.S. Cl. .............................. 386/111; 360/32; 348/384
[58] Field of Search .................................. 348/384, 387, 348/390, 397, 409, 410; 358/335, 310, 342, 343, 341; 360/32, 69

[56] References Cited

U.S. PATENT DOCUMENTS

| | | | |
|---|---|---|---|
| 4,569,058 | 2/1986 | Grallert | 375/27 |
| 4,706,265 | 11/1987 | Furukawa | 375/122 |
| 5,016,107 | 5/1991 | Sasson et al. | 358/209 |
| 5,068,724 | 11/1991 | Krause et al. | 348/384 |
| 5,093,731 | 3/1992 | Watanabe et al. | 358/335 |
| 5,136,376 | 8/1992 | Yagasaki et al. | 348/384 |
| 5,442,399 | 8/1995 | Asamura et al. | 348/394 |

*Primary Examiner*—Thai Q. Tran
*Assistant Examiner*—Robert Chevalier
*Attorney, Agent, or Firm*—Limbach & Limbach L.L.P.

[57] ABSTRACT

A data compressor codes each frame of a digital input signal with both equal length coding and unequal length coding and selects the coding requiring fewer bits to code the frame as a frame of the compressed digital signal provided by the data compressor. Also included in the compressed digital signal is a decision signal that indicates the coding of the frame. In a variation, the input signal is divided in frequency into plural frequency ranges and a frequency range signal in each frequency range is coded with both equal length coding and unequal length coding. For each frequency range, the coding requiring fewer bits to code each frame of the frequency range signal is selected and included in the compressed digital signal. A decision signal for each frequency range is included in the compressed digital signal. A complementary data expander extracts the decision signal from the compressed digital signal. The expander expands each frame in the compressed digital signal using equal length decoding or unequal length decoding selected according to the extracted decision signal. In a variation, a decision signal is extracted for each frequency range, and each coded frequency range signal is expanded using equal length decoding or unequal length decoding selected according to the extracted decision signal for the frequency range.

10 Claims, 11 Drawing Sheets

APPARATUS AND METHOD FOR DATA COMPRESSION AND EXPANSION USING HYBRID EQUAL LENGTH CODING AND UNEQUAL LENGTH CODING

This is a continuation of application Ser. No. 08/222,574, filed Apr. 4, 1994, now allowed which is a continuation of application Ser. No. 07/937,968, filed Aug. 28, 1992 now abandoned.

FIELD OF THE INVENTION

This invention relates to an apparatus for providing a data compressed digital signal having unequal length blocks and being suitable for real time signal recording or transmission. The invention also relates to an apparatus for providing a complementary data expansion for real-time reproduction of a data compressed signal having unequal length blocks.

BACKGROUND OF THE INVENTION

FIG. 1 shows a conventional encoder incorporating a data compression circuit which produces a data compressed digital signal having equal length blocks.

In FIG. 1, an input analog signal, such as an analog signal representing an audio signal, is converted into a PCM digital signal by the analog to digital (A/D) converter 101. The PCM digital signal is arranged into plural frames. Each frame includes a predetermined number of samples of the PCM digital signal. The band dividing filter 102 divides the PCM digital signal in frequency into a number of frequency ranges, for example, two frequency ranges. The frequency range signals, one for each frequency range, are transmitted to the scaling factor calculating circuits 108 and 113. Each of the scaling factor calculating circuits determines a scaling factor for its respective frequency range signal.

The scaling factors are fed into the scaling factor quantizing circuits 109 and 114, where the scaling factors are quantized using a predetermined number of bits. The resulting quantized scaling factors are transmitted to the scaling factor dequantizing circuits 110 and 115, and to the multiplexer 105.

Each of the scaling factor dequantizing circuits 110 and 115 dequantizes its respective quantized scaling factor. The resulting dequantized scaling factors are transmitted to the quantizing circuits 106 and 108, and to the quantizing bit number decision circuit 116. The quantizing bit number decision circuit sets the number of quantizing bits for quantizing each frequency range signal.

The quantizing bit numbers are transmitted to the quantizing circuits 103 and 111, where the two frequency range signals from the band dividing filter 102 are equal length coded using their respective dequantized scaling factors and the quantizing bit numbers. The resulting coded frequency range signals are fed into the multiplexer 105, which multiplexes together the respective equal length coded frequency range signals and the quantized scaling factors to provide an output bit stream. The output bit stream has a constant bit rate that is suitable for feeding into a transmission channel or recording/reproducing system, such as a digital audio tape recorder, that requires a constant bit-rate bit steam.

FIG. 2 shows a conventional decoding apparatus for deriving an analog signal from an equal length coded compressed digital signal reproduced from a transmission channel or recording medium in equal length blocks. The decoding apparatus includes a complementary data expander for expanding the compressed digital signal.

In the decoder shown in FIG. 2, a bit-stream of a data-compressed digital signal produced by, for example, the encoder shown in FIG. 1, and reproduced from a transmission channel or recording medium, is demultiplexed by the demultiplexer 203 into an equal length coded frequency range signal and a quantized scaling factor for each frequency range. The quantized scaling factor for each frequency range is dequantized by the scaling factor dequantizing circuits 208 and 211. The dequantized scaling factors are then transmitted to the dequantizing circuits 205 and 210, and to the quantization bit number decision circuit 213. The dequantizing circuits 205 and 210 decode the equal length coded frequency range signals from the demultiplexer 203 using the quantization bit numbers and the dequantized scaling factors for each respective frequency range. The frequency synthesizer 206 synthesizes the decoded frequency range signals and provides a synthesized output signal for conversion back to an analog signal by the digital to analog converter 205

FIGS. 3 and 4 show unequal length coding added to an equal length coding compressor employed in a digital encoder, such as that shown in FIG. 1, and to an equal length coding expander in a digital decoder, such as that shown in FIG. 2.

Unequal length coding, also known as variable length coding, is a coding system in which the length of a code allocated to code a data point, such as a data point representing the amplitude of a sample of an analog signal, is changed with the probability of occurrence of the data point. The length of a code is the number of bits in the code. In unequal length coding, a shorter code is allocated to code a data point that has a higher probability of occurring and a longer code is allocated to code a data point that has a lower probability of occurring. This reduces the number of bits required to code a plurality of normally distributed data points, for example, to code one frame of a digital input signal. The data compression efficiency is thereby increased. A typical variable length coding system is the Huffman code system.

In unequal length coding, code is allocated among the data points according to one or more statistical models, such as a Gaussian distribution or a Laplacian distribution. Since, according to such distributions, there is a higher probability of smaller input signal amplitudes occurring, shorter codes are allocated to smaller amplitudes, and longer codes are allocated to larger amplitudes, respectively.

FIGS. 3 and 4 show examples of a conventional encoder incorporating a data compressor with unequal length coding, and a conventional decoder incorporating an expander for an unequal length coded compressed digital signal.

The encoder in FIG. 3 is based on the encoder shown in FIG. 1. In the encoder shown in FIG. 3, the connections between the quantizing circuits 103 and 111 and the multiplexer 105 are intercepted by the unequal length coding circuits 104 and 112, respectively. The unequal length coding circuits 104 and 112 also receive quantizing bit numbers from the quantizing bit number decision circuit 116. In response to the quantizing bit numbers, the unequal length coding circuits unequal length code the quantized frequency range signals. The unequal length coded frequency range signals, which have a different number of bits in each frame, are fed into the multiplexer 105.

The multiplexer multiplexes together the unequal length coded frequency range signals and the quantized scaling factors and feeds a bit stream into the buffer 106, where it is temporarily stored. The bit stream has a varying bit rate because the number of bits in each frame varies from frame-to-frame as a result of the unequal length coding.

A bit stream is read out of the buffer 106 at a constant bit rate suitable for feeding into a transmission channel or a recording and reproducing system, such as a digital audio tape recorder, that requires a constant bit-rate bit steam.

Since the construction and operation of the encoder using unequal length coding shown in FIG. 3 is otherwise the same as that of the encoder using equal length coding shown in FIG. 1, and the same components in the drawings are indicated by the same numerals, the corresponding description is omitted for brevity.

A decoder incorporating a complementary data expander for an unequal length coded compressed digital signal is shown in FIG. 4. The decoder shown in FIG. 4 is similar to the decoder incorporating an expander for equal length coded signals shown in FIG. 2. In the decoder shown in FIG. 4, a bit stream, including frames each having a different number of bits, is received at a constant bit rate from the transmission channel or the reproducing system (not shown) and is stored in the buffer 201. The bit stream is read out of the buffer at a non-constant bit rate into the multiplexer 203, which demultiplexes the bit stream into an unequal length coded frequency range signal and a quantized scaling factor for each frequency range, for example, for two frequency ranges.

The connections between the demultiplexer 203 and the dequantizing circuits 205 and 210 in the decoder shown in FIG. 2 are interrupted in the expander shown in FIG. 4 by the unequal length decoding circuits 204 and 209, respectively. The unequal length decoding circuits 204 and 209 also receive quantizing bit number data from the quantizing bit number decision circuit 211.

The two unequal length coded frequency range signals are fed from the demultiplexer 201 into the unequal length decoding circuits 204 and 209, where the unequal length coding is decoded. The resulting quantized frequency range signals are supplied to the dequantizing circuits 205 and 210, where they are equal length decoded.

Since the construction and operation of the decoder for unequal length coded signals shown in FIG. 4 is otherwise the same as that of the decoder for equal length coded signals shown in FIG. 2, and the same components in the drawings are indicated by the same numerals, the corresponding description is omitted for brevity.

In the encoder and the decoder shown in FIGS. 3 and 4, respectively, since the transmission system or the recording and/or reproduction system requires a bit stream having a constant bit rate, a buffer must be provided on the output of the encoder and on the input of the decoder if real-time recording and reproduction is desired. The state of a buffer in the encoder at a given time is represented by $$B(n)=B(n-1)+Bin(n)-Bout(n) \ [bits] \qquad (1)$$

where n indicates the nth update cycle of the buffer, $B(n)$ indicates the volume of data stored in the buffer, $Bin(n)$ the volume of data written into the buffer in the nth cycle, and $Bout(n)$ the volume of data read out of the buffer in the nth cycle.

In the formula (1), $Bin(n)$ varies because of the unequal length coding, and $Bout(n)$ is constant because the output bit rate is constant. If unequal length coding allocates a high concentration of longer codes, and the volume of data written into the buffer exceeds the volume of data read out from the buffer for several update cycles, the buffer may overflow. In this case, the volume of data $B(n)$ to be stored in the buffer exceeds the data capacity of the buffer $Bmax$ ($B(n)>Bmax$). Conversely, if unequal length coding allocates a high concentration of shorter codes, and the volume of written into the buffer falls below the volume of data read out from the buffer for several update cycles, the buffer may underflow. In this case, the buffer runs out of data for transmission or recording ($B(n)<0$).

Known methods of overcoming these problems include:

(a) using a buffer with a larger capacity, or (b) changing the scaling factor such that buffer overflow or underflow is inhibited in circumstances in which overflow or underflow is likely to occur.

With the measure (b), the buffer state is monitored so that, if it appears that an overflow is likely, the scaling factor is increased to reduce the amplitude of the signals to be coded. Since unequal length coding allocates shorter codes to smaller amplitude signals, increasing the scaling factor helps prevent buffer overflow. Conversely, if it appears that an underflow is likely, the scaling factor is decreased to increase the amplitude of the signals to be coded. Since unequal length coding allocates longer codes to larger amplitude signals, decreasing the scaling factor helps prevent buffer underflow.

The above measure (a) of using a buffer with a larger capacity leads to increased hardware complexity, and the measure (b) of changing the scaling factor makes it impossible to obtain desired performance characteristics.

OBJECTS AND SUMMARY OF THE INVENTION

In view of the above-described state of the art, it is an object of the present invention to provide a data compressor circuit using unequal length coding in which the probability of buffer overflow and underflow is reduced. It is a further object of the invention to reduce the required recording capacity of the recording medium by increasing the data compression efficiency, and thereby reducing the total number of bits to be recorded.

For accomplishing the above object, the present invention provides a first embodiment of an apparatus for compressing a digital input signal divided into frames to provide a recording signal for real-time recording. The apparatus includes an equal length coder that codes a frame of the digital input signal to provide an equal length coded frame that includes a predetermined number of bits. An unequal length coder codes the frame of the digital input signal to provide an unequal length coded frame including a variable number of bits. A selecting circuit includes the equal length coded frame in the recording signal when the variable number of bits is greater than the predetermined number of bits and includes the unequal length coded frame in the recording signal when the variable number of bits is less than the predetermined number of bits.

In a variation on the first embodiment, the apparatus additionally includes a frequency dividing circuit that divides the digital input signal in frequency into plural frequency ranges. The frequency dividing circuit provides, for each frequency range, a frequency range signal divided into frames. Each frame of the frequency range signals corresponds to a frame of the digital input signal. The apparatus also includes a bit allocation decision circuit that determines, for each frame of the digital input signal, an allocation of the predetermined number of bits among the plural frequency ranges. The equal length coder includes a frequency range equal length coder that equal length codes a frame of the frequency range signal in each frequency range to provide a frame of an equal length coded frequency range signal. The frames of the equal length coded frequency range signals for all the frequency ranges together constitute an equal length coded frame that includes the predetermined number of bits. The unequal length coder includes a frequency range unequal length coder that unequal length codes the frame of the frequency range signal in each frequency range to provide a frame of an unequal length coded frequency range signal. The unequal length coded frequency range signals for all the frequency ranges together constitute an unequal length coded frame that includes a variable number of bits.

In a second embodiment of a data compressor according to the invention, an apparatus for compressing a digital input signal divided into frames to provide a recording signal for real-time recording is provided. The apparatus comprises a frequency dividing circuit that divides the digital input signal in frequency into plural frequency ranges The frequency dividing circuit also provides, in each frequency range, a frequency range signal divided into frames. Each frame of the frequency range signals corresponds to a frame of the digital input signal. A bit allocation decision circuit determines, for each frame of the digital input signal, an allocation of a predetermined number of bits among the frequency range signals. A first coding circuit equal length codes a frame of the frequency range signal in each frequency range to provide a frame of an equal length coded frequency range signal including a first number of bits. A second coding circuit unequal length codes the frame of the frequency range signal in each frequency range to provide a frame of an unequal length coded frequency range signal including a second number of bits. Finally, a selecting circuit includes the frame of the equal length coded frequency range signal in the recording signal for each frequency range in which the first number of bits is greater than the second number of bits, and includes the frame of the unequal length coded frequency range signal in the recording signal for each frequency range in which the first number of bits is less than the second number of bits.

Since, with the data compressor according to the invention, when unequal length coded frames are selected, the number of bits per frame is not greater than the number of bits per frame required by equal length coding, the probability of buffer overflow is reduced, or the buffer capacity may be reduced. Also, since the mean number of bits produced by the data compression process is reduced, the data compression efficiency is increased, which enables the capacity of the recording medium to be reduced.

In a recorder according to the invention incorporating any of the data compressors according to the invention and recording on a semiconductor memory as a record medium, the selecting circuit provides a recording signal that comprises a plurality of frames, each of which may include a different number of bits. The recorder includes a write control circuit that generates a write control signal in response to the number of bits in a frame of the recording signal. A writing circuit receives the frame of the recording signal from the selecting circuit and writes the frame of the recording signal into the semiconductor memory at a variable bit rate determined by the write control signal according to the number of bits in the frame. Alternatively, the writing circuit writes the frame of the recording signal into the semiconductor memory at a fixed bit rate for a writing time determined by the write control signal according to the number of bits in the frame.

In a first embodiment of a complementary data expander according to the invention, an apparatus for expanding a compressed digital signal in real time to provide a digital output signal is provided. The compressed digital signal includes plural frames and a decision signal for each frame. Each frame is coded with coding selected from equal length coding and unequal length coding, and the decision signal indicates the coding for the frame. The expander comprises a circuit for extracting the decision signal for a frame of the compressed digital signal from the compressed digital signal. A selective decoding circuit receives the frame of the compressed digital signal, equal length decodes the frame when the decision signal indicates that the frame is equal length coded, and unequal length decodes the frame when the decision signal indicates that the frame is unequal length coded. Finally, the selective decoding circuit includes the decoded frame of the compressed digital signal in the digital output signal.

A first variation expands a compressed digital signal derived from an input signal divided into frequency ranges. Each frame of the compressed digital signal includes plural coded frequency range signal frames resulting from coding a frame of an input signal divided in frequency to provide a frequency range signal frame in each one of plural frequency ranges. Each frequency range signal frame is coded with the same coding selected from equal length coding and unequal length coding. The decision signal indicates the coding for the frequency range signals in the frame of the compressed digital signal.

The expander additionally comprises a demultiplexing circuit that divides a frame of the compressed digital signal into a coded frequency range signal frame for each frequency range. The selective decoding circuit receives a coded frequency range signal frame, equal length decodes the coded frequency range signal frame when the decision signal indicates that the frequency range signals in the frame of the compressed digital signal are equal length coded, and unequal length decodes the coded frequency range signal frame when the decision signal indicates that the frequency range signals in the frame of the compressed digital signal are unequal length coded. The selective decoding circuit additionally includes the decoded frequency range signal frame in a frequency range output signal. Finally, the expander additionally includes a circuit that synthesizes plural frequency range output signals to provide the digital output signal.

A second embodiment of an expander according to the invention also a expands compressed digital signal in real time to provide a digital output signal. The compressed digital signal includes plural frames and plural decision signals for each frame. Each frame includes plural coded frequency range signal frames resulting from coding a frame of an input signal divided in frequency to provide a frequency range signal frame in each one of plural frequency ranges. Each frequency range signal frame is coded with coding selected from equal length coding and unequal length coding, and each decision signal indicates the coding for a coded frequency range signal frame in the frame of the compressed digital signal.

The expander comprises a circuit that the extracts the decision signals for a frame of the compressed digital signal from the compressed digital signal. A demultiplexing circuit divides the frame of the compressed digital signal into a coded frequency range signal frame for each frequency range. A selective decoding circuit receives the coded frequency range signal frame for each frequency range, equal length decodes the coded frequency range signal frame when the decision signal corresponding to the coded frequency range signal frame indicates that the coded frequency range signal frame is equal length coded and unequal length decodes the coded frequency range signal frame when the decision signal corresponding to the coded frequency range signal frame indicates that the coded frequency range signal frame is unequal length coded. The selective decoding circuit also includes the decoded frequency range signal frame in a frequency range output signal. Finally, the expander includes a circuit that synthesizes plural frequency range output signals to provide the digital output signal.

A reproducing apparatus according to the invention incorporating any of the data expanders according to the invention is adapted for reproducing a compressed digital signal recorded on a semiconductor memory as a recording medium. The compressed digital signal additionally includes data indicating the number of bits in each frame. The reproducing apparatus additionally includes a reading circuit that reads from the semiconductor memory the data indicating the number of bits in a frame of the compressed digital signal. A read control circuit generates a read control signal in response to the data indicating the number of bits in the frame. The reading circuit additionally reads from the semiconductor memory at a variable bit rate determined by the read control signal according to the number of bits in the frame to provide the frame of the compressed digital signal. Alternatively, the reading circuit additionally reads from the semiconductor memory at a fixed bit rate for a reading time determined by the read control signal according to the number of bits in the frame to provide a frame of the compressed digital signal.

In a first method according to the invention of compressing a digital input signal divided into frames to provide a recording signal for real-time recording, a frame of the digital input signal is provided. The frame of the digital input signal is equal length coded to provide an equal length coded frame including a predetermined number of bits. The frame of the digital input signal is also unequal length coded to provide an unequal length coded frame including a variable number of bits. The equal length coded frame is included in the recording signal when the variable number of bits is greater than the predetermined number of bits and the unequal length coded frame is included in the recording signal when the variable number of bits is less than the predetermined number of bits.

In a variation, a predetermined number of bits are additionally provided, and the digital input signal is additionally divided in frequency into plural frequency ranges. A frequency range signal divided into frames is provided for each frequency range. Each frequency range signal frame corresponds to a frame of the digital input signal. For each frame of the digital input signal, an allocation of the predetermined number of bits among the plural frequency ranges is determined. In the step of equal length coding the frame of the digital input signal, a frame of the frequency range signal in each frequency range is equal length coded to provide a frame of an equal length coded frequency range signal. The frames of the equal length coded frequency range signals for all the frequency ranges together constitute an equal length coded frame that includes the predetermined number of bits. In the step of unequal length coding the frame of the digital input signal, the frame of the frequency range signal in each frequency range is unequal length coded to provide a frame of an unequal length coded frequency range signal. The unequal length coded frequency range signals for all the frequency ranges together constitute an unequal length coded frame that includes a variable number of bits.

In a second method according to the invention of compressing a digital input signal divided into frames to provide a recording signal for real-time recording, a predetermined number of bits is provided. The digital input signal is divided in frequency into plural frequency ranges, and a frequency range signal divided into frames corresponding to the frames of the digital input signal is provided in each frequency range. An allocation of the predetermined number of bits among the frequency range signals is determined for each frame of the digital input signal. A frame of the frequency range signal in each frequency range is equal length coded to provide a frame of an equal length coded frequency range signal including a first number of bits. The frame of the frequency range signal in each frequency range is unequal length coded to provide a frame of an unequal length coded frequency range signal including a second number of bits. Finally, the frame of the equal length coded frequency range signal is included in the recording signal for each frequency range in which the first number of bits is greater than the second number of bits, and the frame of the unequal length coded frequency range signal is included in the recording signal for each frequency range in which the first number of bits is less than the second number of bits.

A first method according to the invention for expanding a compressed digital signal in real time to provide a digital output signal expands a compressed digital signal that includes plural frames and a decision signal for each frame. Each frame is coded with coding selected from equal length coding and unequal length coding, and the decision signal indicates the coding for the frame. In the method according to the invention, the decision signal for a frame of the compressed digital signal is extracted from the compressed digital signal. The frame of the compressed digital signal is received and the frame of the compressed digital signal is equal length decoded when the decision signal indicates that the frame is equal length coded and is unequal length decoded when the decision signal indicates that the frame is unequal length coded. Finally, the decoded frame of the compressed digital signal is included in the output signal.

In a variation on the first method, the method is for expanding a compressed digital signal including plural frames and a decision signal for each frame. Each frame includes plural coded frequency range signal frames resulting from coding a frame of an input signal divided in frequency to provide a frequency range signal frame in each one of plural frequency ranges. Each frequency range signal frame is coded with the same coding selected from equal length coding and unequal length coding, and the decision signal indicates the coding for the frequency range signals in the frame of the compressed digital signal.

A frame of the compressed digital signal is divided into a coded frequency range signal frame for each frequency range. In the step of selectively decoding with one of equal length decoding and unequal length decoding, a coded frequency range signal frame is received and is equal length decoded when the decision signal indicates that the frequency range signals in the frame of the compressed digital signal are equal length coded and is unequal length decoded when the decision signal indicates that the frequency range signals in the frame of the compressed digital signal are unequal length coded. The decoded frequency range signal frame is included in a frequency range output signal. Finally plural frequency range output signals are synthesized to provide the digital output signal.

In a second data expanding method according to the invention, a compressed digital signal is expanded in real time to provide a digital output signal. The compressed digital signal includes plural frames and plural decision signals for each frame. Each frame includes plural coded frequency range signal frames resulting from coding a frame of an input signal divided in frequency to provide a frequency range signal frame in each one of plural frequency ranges. Each frequency range signal frame is coded with coding selected from equal length coding and unequal length coding, and each decision signal indicates the coding for a coded frequency range signal frame in the frame of the compressed digital signal. The decision signals for a frame of the compressed digital signal are extracted from the compressed digital signal.

The frame of the compressed digital signal is divided into a coded frequency range signal frame for each frequency range. Each coded frequency range signal frame is equal length decoded when the decision signal corresponding to the coded frequency range signal frame indicates that the coded frequency range signal frame is equal length coded and is unequal length decoded when the decision signal corresponding to the coded frequency range signal frame indicates that the coded frequency range signal frame is unequal length coded. The decoded frequency range signal frame is included in a frequency range output signal. Finally, plural frequency range output signals are synthesized to provide the digital output signal.

DETAILED DESCRIPTION OF THE INVENTION

The present invention relates to a circuit for applying data compression to a digital signal representing a sampled audio signal for real time recording and/or reproduction. Briefly, the basic principle of the present invention resides in that, if unequal length coding requires more bits to code a frame of the input signal than equal length coding, the equal length coded frame is selected. On the other hand, if unequal length coding requires fewer bits to code a frame of the input signal than equal length coding, the unequal length coded frame is selected. A signal indicating the selected coding (equal length coding or unequal length coding) for each frame is included with the coded frame in the compressed digital signal that is recorded or transmitted.

When the compressed digital signal is reproduced, the signal indicating the selected coding is read out and used to select the appropriate decoder for decoding the reproduced coded frame.

In a second embodiment, the input signal is divided into a plurality of frequency range signals for coding, and the coding for each frame of each frequency range signal is individually selected according to which coding requires fewer bits to code the frame of the frequency range signal. In this embodiment, a signal indicating the coding for each frame of each frequency range signal is included in the compressed digital signal that is recorded or transmitted.

When the compressed digital signal is reproduced, the signal indicating the selected coding for each frame of each frequency range signal is extracted from the compressed digital signal and used to select the appropriate decoder for decoding the reproduced coded frame of each frequency range signal.

Figure 3:
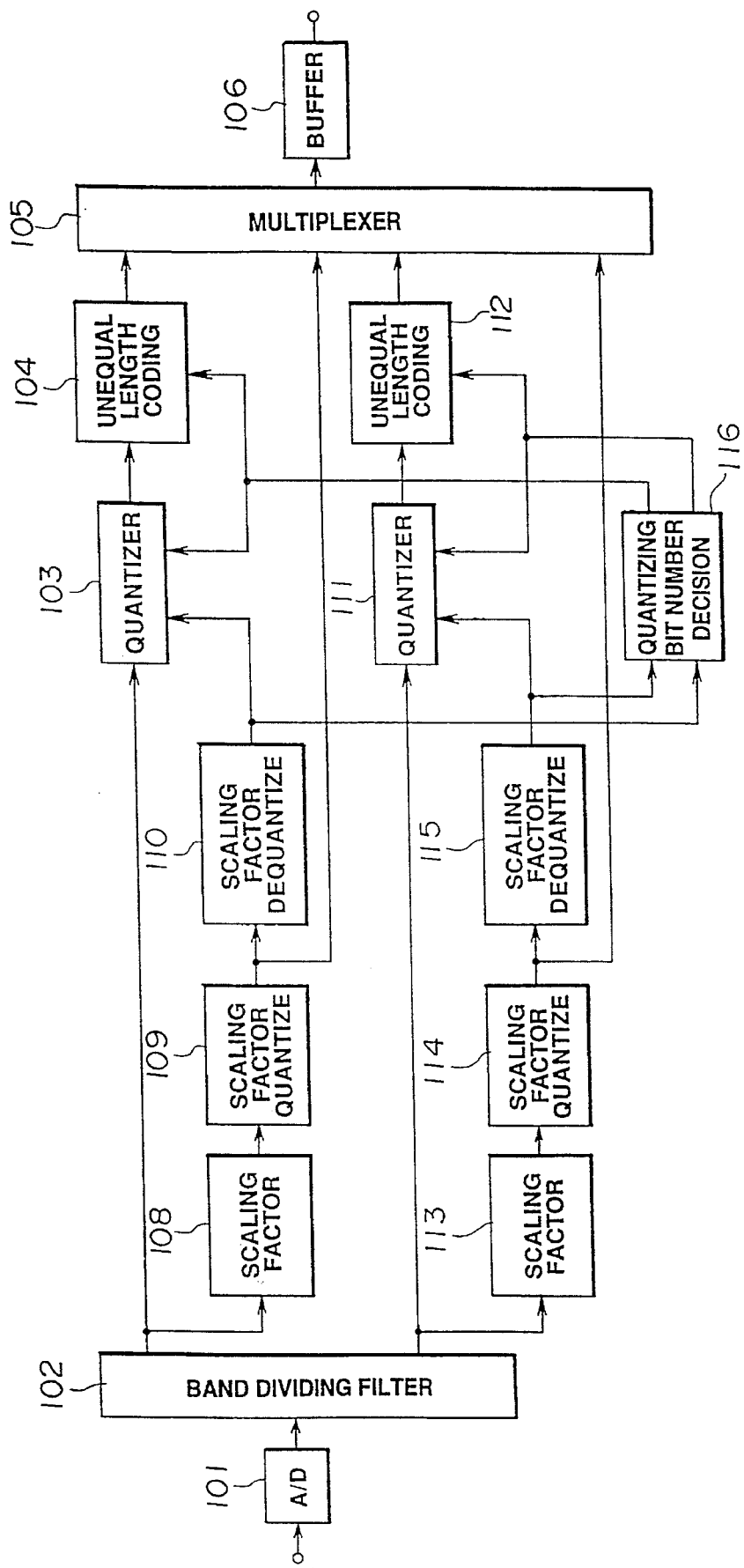
FIG. 3 is a block circuit diagram showing an example of a conventional encoder employing unequal length coding.
Figure 4:
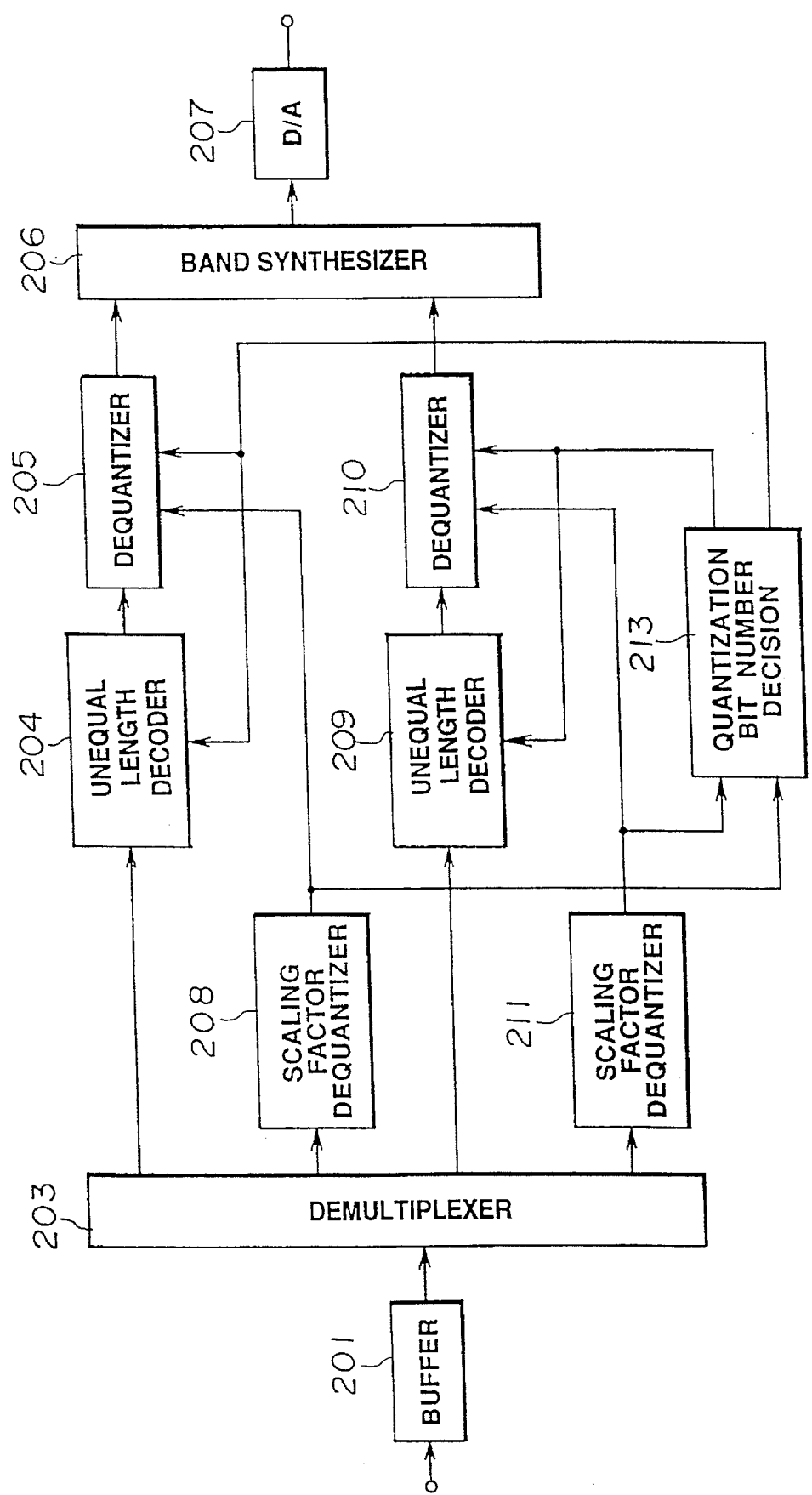
FIG. 4 is a block circuit diagram showing an example of a conventional decoder for an unequal length coded compressed digital signal.
Figure 5:
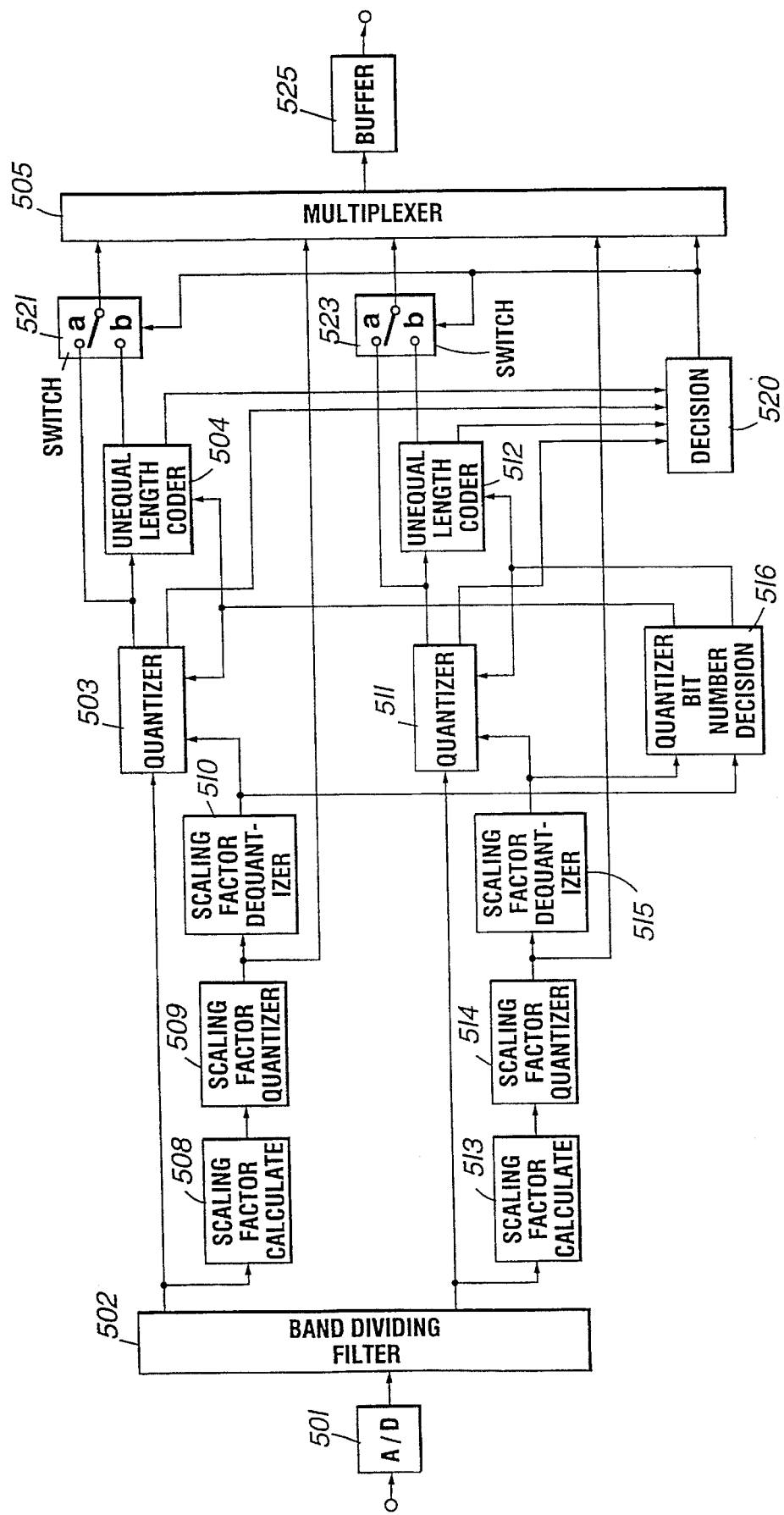
FIG. 5 is a block circuit diagram showing an encoder incorporating a data compressor according to a first aspect of the present invention.
Figure 7:
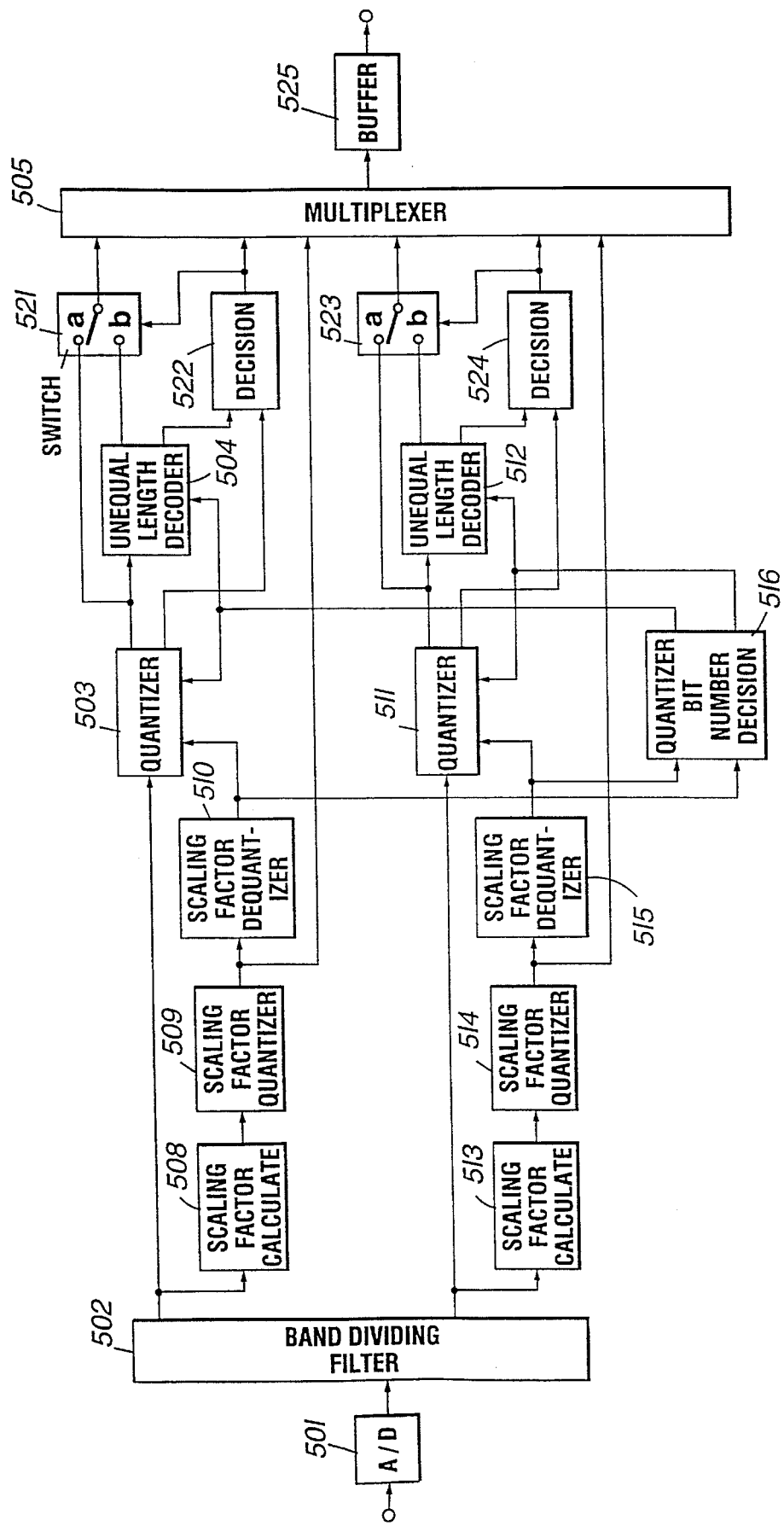
FIG. 7 is a block circuit diagram showing an encoder incorporating a data compressor according to a second aspect of the invention in which coding is selected to minimize the number of bits required to code each of a plurality of frequency range signals derived from the input signal.

If the number of bits in the buffer of the conventional encoder using unequal length coding shown in FIG. 3 is expressed as $$Ba(n)=Ba(n-1)+Bina(n)-Bout(n) \text{ [bits]} \quad (2)$$

and the number of bits in the buffer of the encoder according to the invention shown in FIGS. 5 or 7 is expressed as $$Bb(n)=Bb(n-1)+Binb(n)-Bout(n) \text{ [bits]} \quad (3)$$

the maximum value, Binb(n)max, of the data inflow, Binb(n), into the buffer is equal to the fixed number of bits produced when the input signal is equal length coded. That is, when unequal length coding a frame of the input signal requires fewer bits than the fixed length code resulting from equal length coding the frame, the bits resulting from unequal length coding the frame are fed into the buffer.

When unequal length coding a frame of the input signal requires more bits than the fixed code length resulting from equal length coding the frame, the bits resulting from unequal length coding the frame are not fed into the buffer. Instead, the bits resulting from equal length coding the frame are fed into the buffer.

As a result of this, the relationship $$Bin_b(n)\ max \leq Bin_a(n)\ max \qquad (4)$$

holds, so that, if unequal length coding generates a high concentration of longer codes, such as when the input signal has an amplitude close to the maximum, there are fewer bits in the buffer than with conventional unequal length coding. Hence, the probability of buffer overflow is reduced.

The mean bit rate of the data inflow into the buffer for the conventional encoder and the encoder according to the invention is the mean of $Bin_a(n)$ and $Bin_b(n)$, respectively. Since the maximum value $Bin_b(n)max$ is less than $Bin_a(n)max$, as may be seen from the above formula (4), the mean bit rate is also reduced in the data compressor according to the invention.

In the above formulas (2) to (4), the terms B(n), Bin(n) and Bout(n) denote the volume of data stored in the buffer, the data inflow into the buffer and the data outflow from the buffer, respectively. The letter n in parentheses in the above formulas denotes the nth buffer update cycle. The letters a and b in the above formulas indicate the system with conventional unequal length coding, and the system according to the present invention, respectively.

Figure 6:
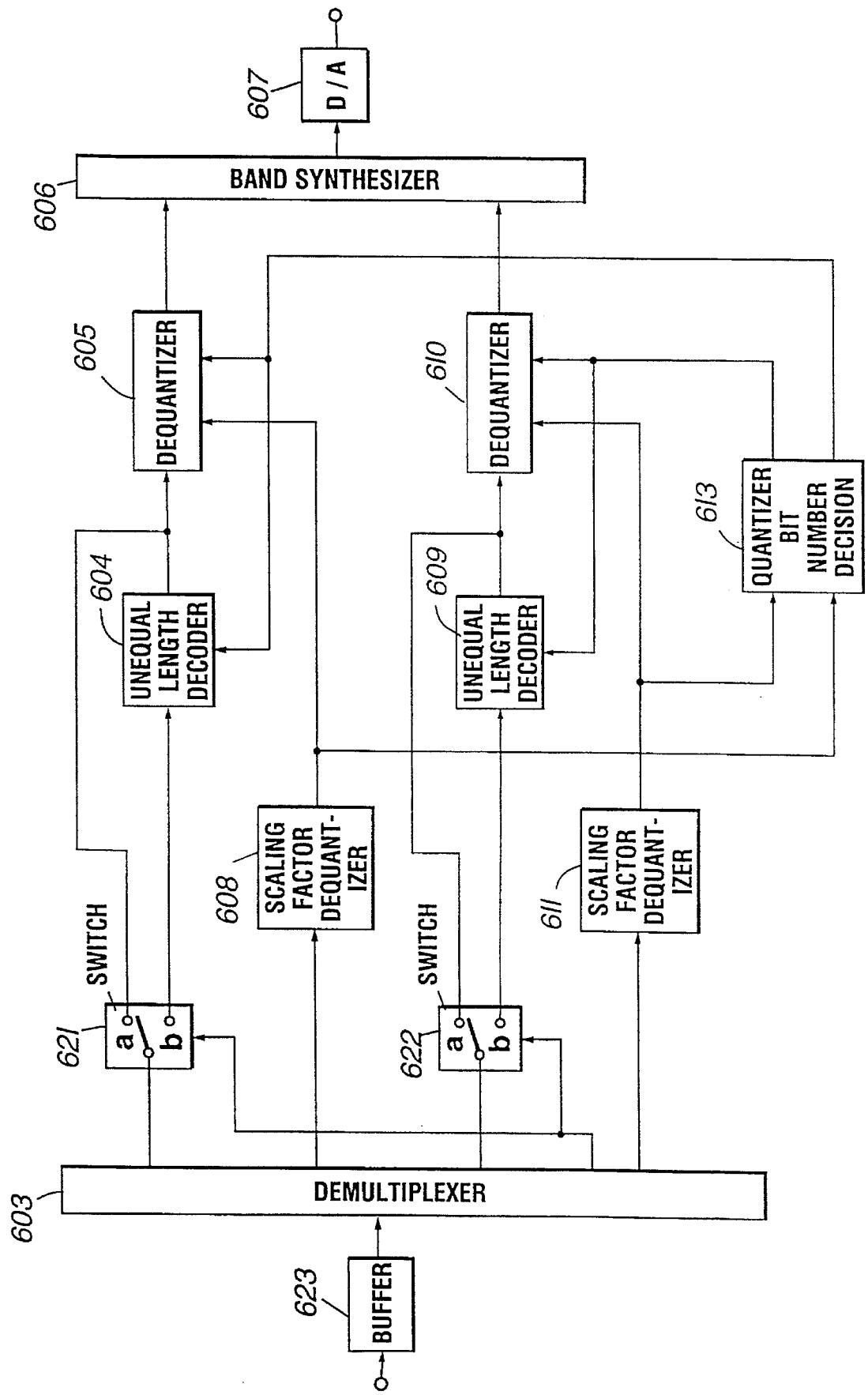
FIG. 6 is a block circuit diagram showing a decoder incorporating an expander according to a first aspect of the invention.

Referring to FIGS. 5 and 6, the first embodiment of the present invention will now be described in detail.

FIG. 5 is a block circuit diagram showing an encoder incorporating a data compressor according to the first aspect of the present invention. In the encoder shown in FIG. 5, an analog input signal, such as an analog signal representing an audio signal, is converted into a PCM digital input signal by the analog to digital converter 501.

The digital input signal is arranged into frames, each frame including a predetermined number of samples of the digital input signal. The band dividing filter 502 divides the digital input signal in frequency into a number of frequency ranges. In the preferred embodiment, two frequency ranges are used. The following description will describe a data compressor in which the input signal is divided into two frequency ranges. However, the digital input signal may be divided in frequency into more or fewer than two frequency ranges.

The resulting frequency range signals, one for each frequency range, are transmitted to the scaling factor calculating circuits 508 and 513. Each of the scaling factor calculating circuits determines a scaling factor for its respective frequency range signal.

The respective scaling factors are fed into the scaling factor quantizing circuits 509 and 514, where the scaling factors are quantized using a predetermined numbers of bits. The resulting quantized scaling factors are fed into the scaling factor dequantizing circuits 510 and 515, and to the multiplexer 505.

Each scaling factor dequantizing circuit 510 and 515 dequantizes the quantized scaling factor for its respective frequency range signal. The resulting dequantized scaling factors are fed into the quantizing circuits 503 and 511 and to the quantizing bit number decision circuit 516. The quantizing bit number decision circuit determines the number of quantizing bits for coding each frequency range signal.

The quantizing bit numbers are transmitted to the quantizing circuits 503 and 511. Each of the quantizing circuits 503 and 511 equal length codes its respective frequency range signal in response to the dequantized scaling factor and the number of quantizing bits for its respective frequency range signal.

The equal length coded frequency range signals are fed from the quantizing circuits 503 and 511 to the fixed terminals a of the changeover switches 521 and 523. The equal length coded frequency range signals are also fed into the unequal length coding circuits 504 and 512 which apply unequal length coding. The unequal length coded frequency range signals are fed to the fixed terminals b of the changeover switches 521 and 523.

The decision circuit 520 receives signals from the quantizing circuits 503 and 511 and from the unequal length coding circuits 504 and 512. These signals indicate the numbers of bits required to equal length code and to unequal length code, respectively, each frame of each frequency range signal. In response to these signals, the decision circuit 520 compares the total number of bits required to equal length code each frame of the digital input signal with the total number of bits required to unequal length code the same frame of the digital input signal. The decision circuit 520 provides a decision signal that indicates whether equal length coding or unequal length coding requires fewer bits to code each frame of the digital input signal.

In this embodiment, the signals indicating the number of bits required to equal length code each frame of each frequency range signal from the quantizing circuits 503 and 511 to the decision circuit 520 are optional. This is because the total number of bits required to equal length code all the frequency range signals is fixed, and known in advance (see FIG. 9).

The decision signal is supplied to the changeover switches 521 and 523 which connect either the equal length coded frequency range signals from the quantizing circuits 503 and 511 or the unequal length coding frequency range signals from the unequal length coding circuits 504 and 512, respectively, to the multiplexer 505. The switches connect the equal length coded frequency range signals to the multiplexer if the state of the decision signal indicates that equal length coding requires fewer bits to code the frame. The switches connect the unequal length coded frequency range signals to the multiplexer if the state of the decision signal indicates that unequal length coding requires fewer bits to code the frame.

For each frame of the digital input signal, the multiplexer 505 multiplexes together the coded frequency range signals selected in response to the decision signal, the quantized scaling factors, and the decision signal and transmits the resulting compressed digital signal to the buffer 525. A bit stream is read out from the buffer 525 at a constant bit rate into the transmission channel or into the recording/reproducing system, such as digital audio tape recorder.

FIG. 6 shows an embodiment of a decoder incorporating a data expander according to the first aspect of the present invention.

In the decoder shown in FIG. 6, the bit stream from the transmission channel or reproducing apparatus is fed at a constant bit rate into the buffer 601. The bit stream includes frames of compressed data having different lengths. A compressed digital signal including unequal length frames and auxiliary data, such as decision signals and quantized scaling factors, is read out from the buffer into the demultiplexer 603, which extracts the decision signal from the compressed digital signal.

The decision signal controls the state of the changeover switches 621 and 622 according to the coding of the coded frequency range signals in each frame. The movable contact of each of the changeover switches 621 and 622 is moved to the stationary contact a or b when the decision signal indicates that the coded frequency range signals in the frame were equal length coded or unequal length coded, respectively. The demultiplexer 603 demultiplexes the compressed digital signal from the buffer into a frame of coded frequency range signals and its quantized scaling factors. The coded frequency range signals are fed to the movable contacts of the changeover switches 621 and 622. The fixed terminals a and b of the changeover switches are connected to the dequantizing circuits 605 and 610, and to the unequal length decoding circuits 604 and 609, respectively.

If the decision signal indicates that the coded frequency range signals are unequal length coded, the coded frequency range signals from the demultiplexer 603 are fed via the fixed terminals b of the changeover switches 621 and 622 to the unequal length decoding circuits 604 and 609 where the unequal length coding is decoded and the resulting equal length coded signals are supplied to the dequantizing circuits 605 and 610, respectively. Conversely, if the decision signal indicates that the coded frequency range signals are equal length coded, the coded frequency range signals from the demultiplexer 603 are fed via the fixed terminals a of the changeover switches 621 and 622 directly to the dequantizing circuits 605 and 610, respectively, and bypass the unequal length decoding circuits 604 and 609.

The quantized scaling factors for the coded frequency range signals are fed from demultiplexer 603 to the scaling factor dequantizing circuits 608 and 611, where they are dequantized. The dequantized scaling factors are supplied to the dequantizing circuits 605 and 610 and to the quantizing bit number decision circuit 613. The circuit 613 determines the numbers of quantization bits used to quantize the two frequency range signals and the resulting quantizing bit numbers are fed into the dequantizing circuits 605 and 610, and into the equal length decoding circuits 604 and 609.

The dequantizing circuits 605 and 610 equal length decode each of the equal length coded frequency range signals from either the demultiplexer 603 or the unequal length decoder circuits 604 and 609 in response to the dequantized scaling factor and the number of quantizing bits for each respective frequency range signal. The frequency synthesizer 606 synthesizes the frequency range signals from the dequantizing circuits 605 and 610 to provide a synthesized PCM output signal. The PCM output signal is converted to an analog signal by the digital to analog converter 607.

With the above-described encoder and decoder of the first aspect of the present invention, since the number of bits required to code each frame of the digital input signal using the hybrid coding according to the invention is not greater than the number of bits required to code the frame using equal length coding, there is a lower probability of the buffer 525 (FIG. 5) overflowing. This enables a buffer having a smaller storage capacity to be used. Also, because the mean number of bits required to code the digital input signal is reduced, the data compression efficiency is increased, which reduces the amount of storage capacity required in the recording medium to store the compressed digital data representing a given analog signal.

Figure 8:
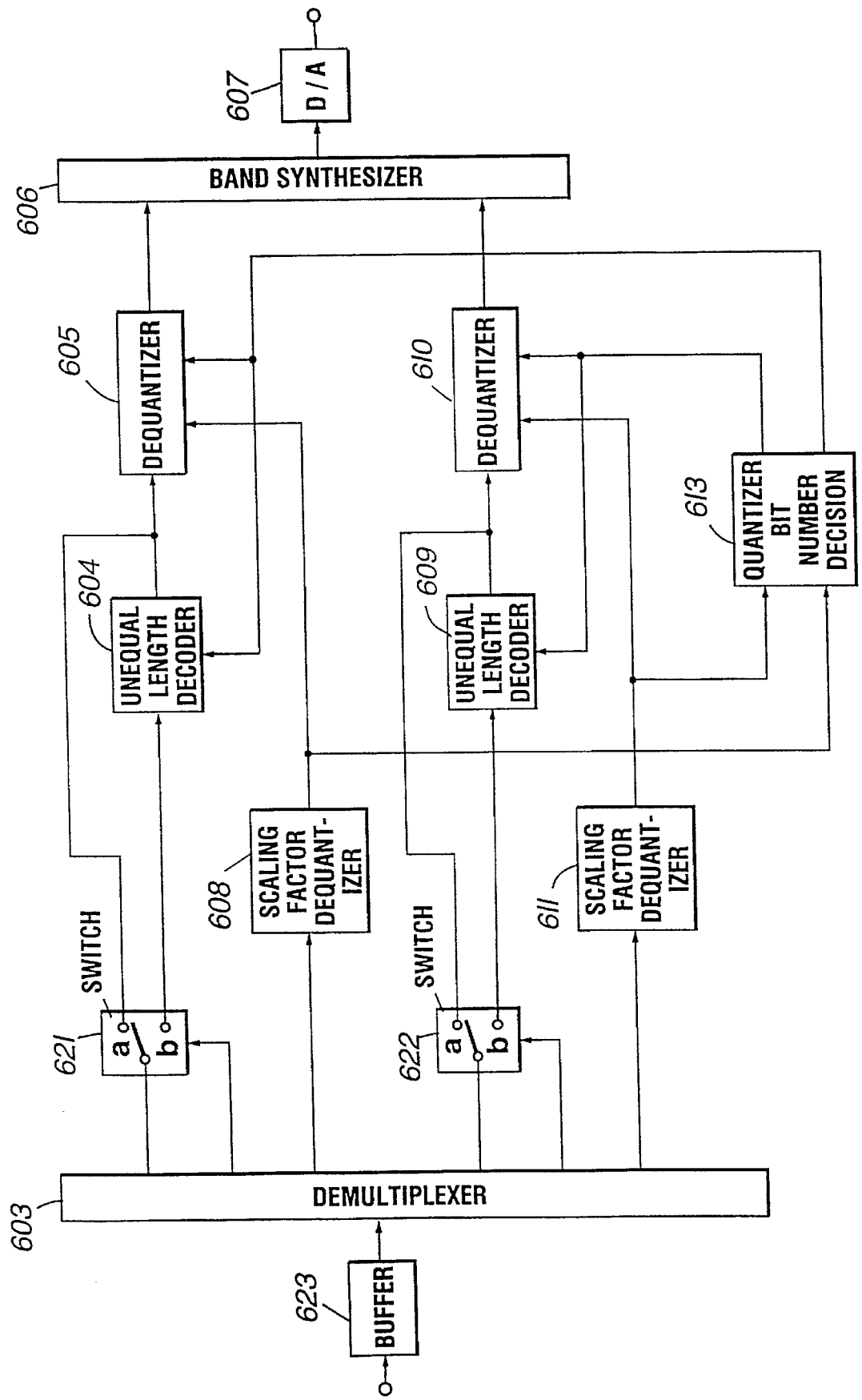
FIG. 8 is a block circuit diagram showing an decoder incorporating a data expander according to a second aspect of the invention in which decoding is selected to decode the compressed digital signal produced by the encoder shown in FIG. 7.

FIGS. 7 and 8 show an encoder incorporating a data compressor according to a second aspect of the invention and a decoder incorporating a data expander according to a second aspect of the invention. In the data compressor and data expander according to the second aspect of the invention, coding is selected according to the number of bits required to code each frequency range signal.

The encoder shown in FIG. 7 differs from the encoder shown in FIG. 5 in that a circuit is provided for independently deciding the coding to use for coding each frequency range signal derived from the digital input signal. The determination is made by comparing the number of bits required to code each frame of each frequency range signal with equal length coding and unequal length coding, and choosing the coding that requires fewer bits.

A signal indicating the number of bits resulting from equal length coding each frame of a first frequency range signal and a signal indicating the number of bits resulting from unequal length coding the same frame of the first frequency range signal are transmitted to the first decision circuit 522 from the unequal length coding circuit 504 and from the quantizing circuit 503, respectively. The circuit 522 compares the two numbers of bits and provides a first decision signal, the state of which indicates the coding that requires fewer bits to code the frame of the first frequency range signal. The changeover switch 521 selects the equal length coded first frequency ranges signal from the quantizing circuit 503 or the unequal length coded first frequency range signal from the unequal length coding circuit 504 in response to the first decision signal.

A signal indicating the number of bits resulting from equal length coding each frame of a second frequency range signal and a signal indicating the number of bits resulting from unequal length coding the same frame of the second frequency range signal are transmitted to the second decision circuit 524 from the quantizing circuit 511 and from the unequal length coding circuit 512, respectively. The circuit 524 compares the two numbers of bits and provides a second decision signal, the state of which indicates the coding that requires fewer bits to quantize the frame of the second frequency range signal. The changeover switch 523 selects the equal length coded second frequency range signal from the quantizing circuit 511 or the unequal length coded second frequency range signal from the unequal length coding circuit 512 in response to the second decision signal.

The first and second decision signals, generated by the first decision circuit 522 for the first frequency range signal and by the second decision circuit 524 for the second frequency range signal, respectively, are fed into the multiplexer 505. For each frame of the digital input signal, the multiplexer 505 forms a compressed digital signal by multiplexing together the coded frequency range signal selected in response to the decision signal, the quantized scaling factor, and the decision signal for each frequency range. The multiplexer transmits the compressed digital signal to the buffer 525. The length of each frame in the compressed digital signal depends on the number of bits required to code each frequency range signal. A bit stream is read out from the buffer 525 at a constant bit rate into the transmission channel or into the recording/reproducing system, such as digital audio tape recorder (DAT).

Since the construction and operation of the encoder shown in FIG. 7 is otherwise the same as that of the embodiment shown in FIG. 5, the same components in the drawings are indicated by the same numerals and the corresponding description is omitted for brevity.

The decoder shown in FIG. 8 differs from the decoder shown in FIG. 6 in that it receives from the recording or transmission medium a decision signal for each frequency range. The signal reproduced from the medium is fed into the buffer 623. The compressed digital signal is read out of the buffer into the demultiplexer 603 which extracts from the compressed digital signal a number of the decision signals for each frame, one for each frequency range. Each extracted decision signal is used to control one of the changeover switches 621 and 623 for its respective frequency range.

Since the construction and operation of the expander shown in FIG. 8 is otherwise the same as that of the embodiment shown in FIG. 6, same components in the drawings are indicated by the same numerals and the corresponding description is omitted for simplicity.

Figure 9:
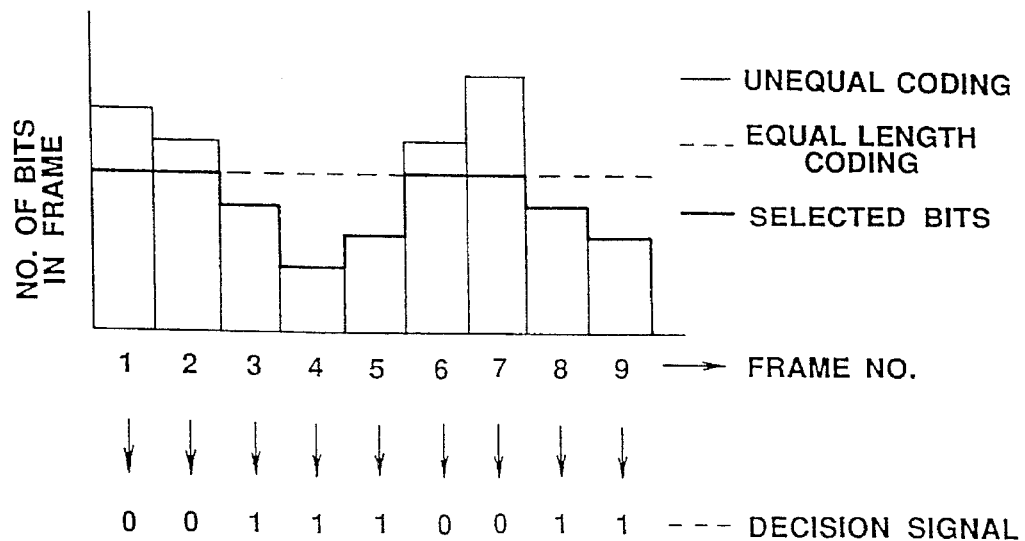
FIG. 9 is a diagrammatic view for illustrating the operation of the embodiments shown in FIGS. 5 and 6.
Figure 10:
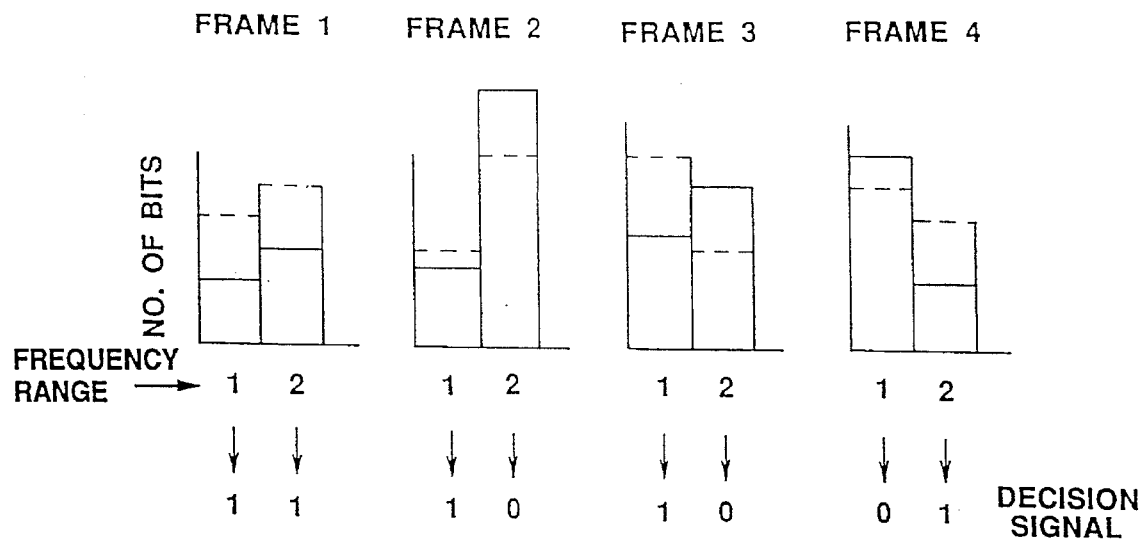
FIG. 10 is a diagrammatic view for illustrating the operation of the embodiments shown in FIGS. 7 and 8.

FIGS. 9 and 10 illustrate how coding is carried out for the purpose of processing for illustrating the processing operations of the above-described two embodiments.

FIG. 9 shows the how the digital input signal is coded in the embodiments shown in FIGS. 5 and 6. In FIG. 5, the abscissa represents the number of each sequentially processed frame of the digital input signal, and the ordinate represents the number of bits in each frame. In this Figure, the solid line indicates the number of bits resulting from unequal length coding the frame, the broken line indicates the number of bits resulting from equal length coding the frame, and the thick solid line indicates the number of bits resulting from coding the frame according to the selected coding. The state of the decision signal is shown below the abscissa. In the figures, the decision signal in its 1 state indicates that unequal length coding has been selected, while the 0 state indicates that equal length coding has been selected.

In the example shown, in frames 1 and 2, unequal length coding produces more bits than equal length coding. Therefore, equal length coding is selected. This is indicated by the decision signal being in its 0 state for frames 1 and 2. In frame 3, unequal length coding produces fewer bits that equal length coding. Therefore, unequal length coding is selected. This is indicated by the decision signal being in its 1 state in frame 3. The relation between the number of bits produced by the two types of coding and the decision signal for the other frames can also be seen.

It is seen from the example of FIG. 9 that the maximum number of bits required to code a frame is equal to the number of bits required to code the frame using equal length coding, and that fewer bits are required to code those frames that are coded with unequal length coding. Therefore, a coder according to the invention produces a mean bit rate less than that obtained using equal length coding alone or using unequal length coding alone.

Further, since the maximum number of bits allocated to each frame is the same as the number of bits required by equal length coding alone, the probability of the buffer overflowing is reduced with an encoder according to the invention. Frames with large numbers of bits produced using unequal length coding, such as frame 7, are not fed into the buffer in an encoder according to the invention.

FIG. 10 shows how the two frequency range signals derived from each frame of the digital input signal are coded in the embodiment shown in FIGS. 7 and 8. In this embodiment, for each frame, two numbers of bits are produced, one for each frequency range. In the figure, the frame number is written above each pair of bit numbers. For each frame, the two frequency ranges are indicated on the abscissa and the number of bits resulting from coding each frequency range signal are indicated on the ordinate.

In FIG. 10, the solid line indicates the number of bits resulting from coding each frame of each frequency range signal using unequal length coding, the broken line indicates the number of bits resulting from coding each frame of each frequency range signal using equal length coding, and the thick solid line indicates the number of bits resulting from coding each frame of each frequency range signal according to the selected coding method. The number of bits used to code each frame of each frequency range signal using equal length coding (broken line) varies from frame to frame because the quantization bit number decision circuit 516 allocates a number of quantizing bits for quantizing each frequency range signal that varies from frame to frame within the range of the total number of bits allocated for coding each frame.

The state of the decision signal for each frequency range is shown below the abscissa. In the figure, a decision signal in its 1 state indicates that the unequal length coding system has been selected, while the 0 state indicates that the equal length coding system has been selected.

In frame 1, for example, since the unequal length coding system uses fewer bits for coding both frequency range signals than the equal length coding system, the unequal length coding system is selected for both frequency range signals. This is indicated by the first and second decision signals both being in the 1 state.

In frame 2, the unequal length coding system uses fewer bits to code the first frequency range signal, while the equal length coding system uses fewer bits to code the second frequency range signal. The unequal length coding system is selected for coding the first frequency range signal and the equal length coding system is selected for coding the second frequency range signal. This is indicated by the first decision signal being in the 1 state and the second decision signal being in the 0 state.

In the manner just described, the coding system requiting the least bits is selected for coding each frame of each frequency range signal.

Figure 11:
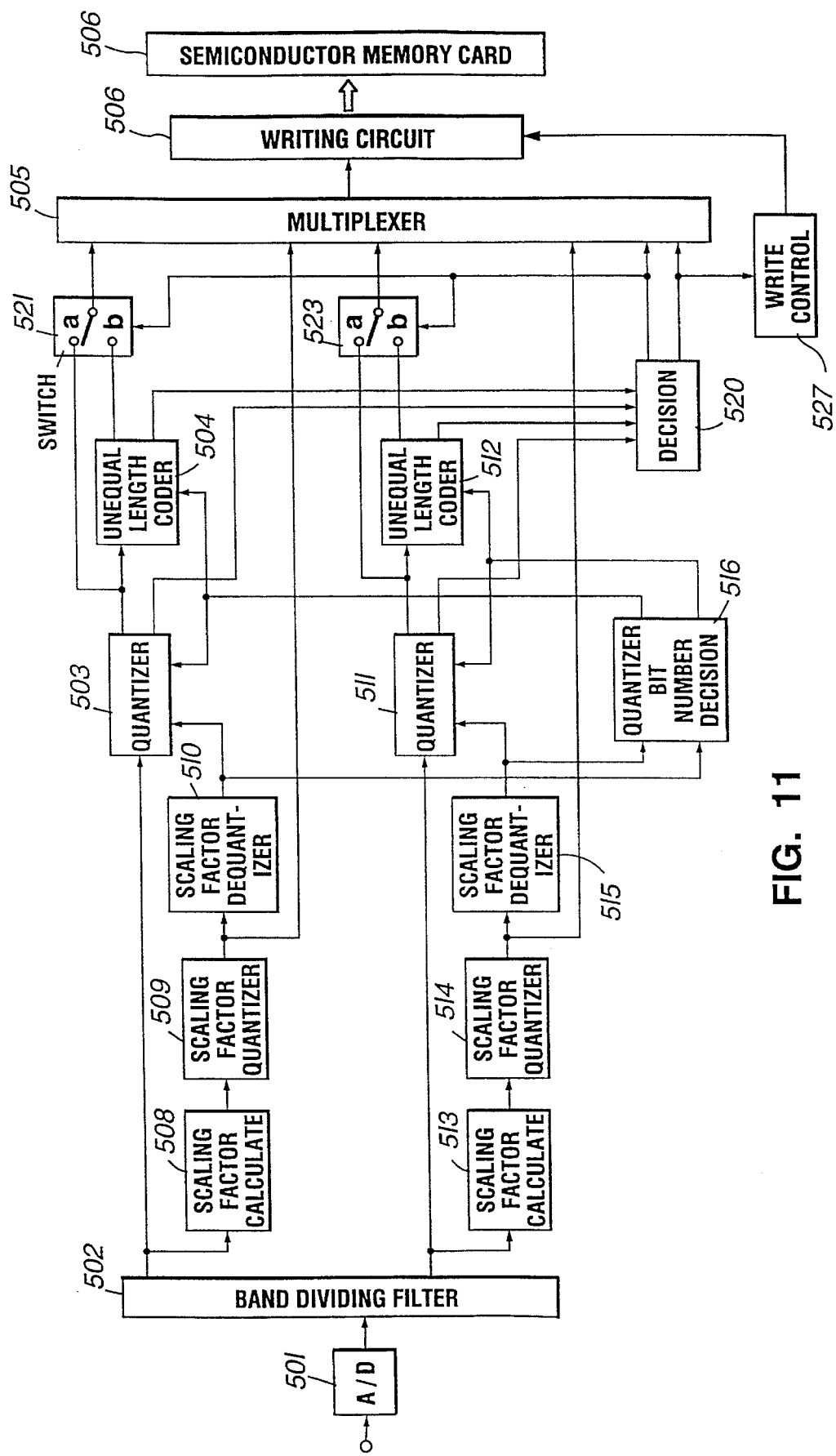
FIG. 11 is a block circuit diagram showing an arrangement of a recording apparatus according to the present invention. The recording apparatus incorporates an encoder according to the present invention and records a recording signal in a semiconductor memory card. The write rate or time into the semiconductor memory card is controlled depending on the number of bits per frame.
Figure 12:
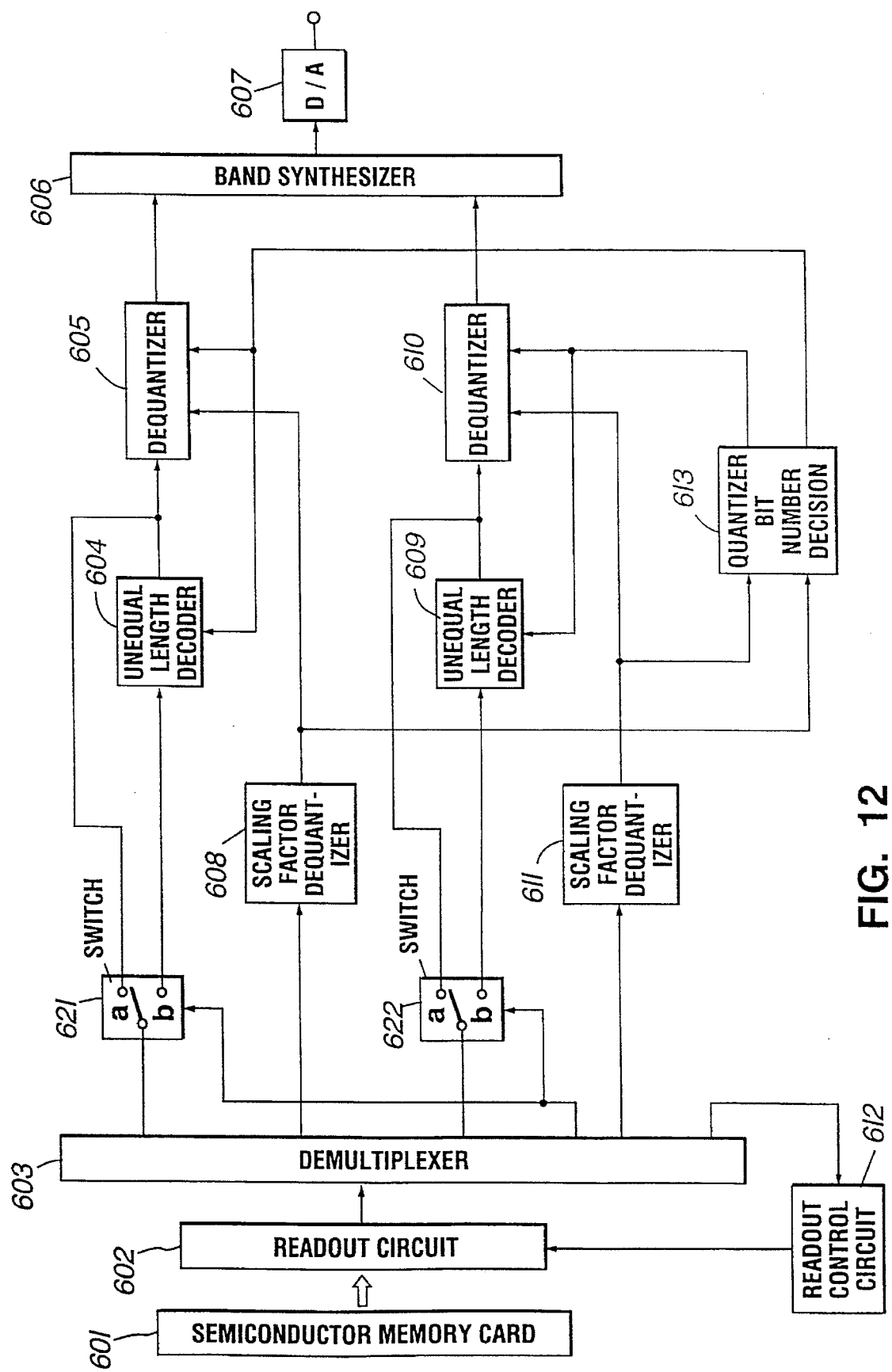
FIG. 12 is a block circuit diagram showing an arrangement of a signal reproducing apparatus according to the present invention. The reproducing apparatus incorporates a decoder according to the present invention and reproduces a signal from a semiconductor memory card. The readout rate or time from the semiconductor memory card is controlled depending on the number of bits per frame.

FIGS. 11 and 12 show a recording apparatus and a reproducing apparatus according to the invention respectively incorporating a data compressor and a data expander according to the invention. The apparatus shown in FIGS. 11 and 12 is capable of real time recording and reproducing using a semiconductor memory card, such as an IC memory card, as the recording medium. In the apparatus, when unequal length coding is employed, the writing or reading bit rate or the writing and reading time is controlled in response to the numbers of bits per frame in the compressed digital signal.

The compressed digital signal comprises the bits resulting from coding each frame of frequency range signals, the quantized scaling factors for the frame, and at least one decision signal for the frame, as described above in connection with FIGS. 5 and 7. The compressed digital signal also includes data indicating the number of bits in the frame.

Figure 1:
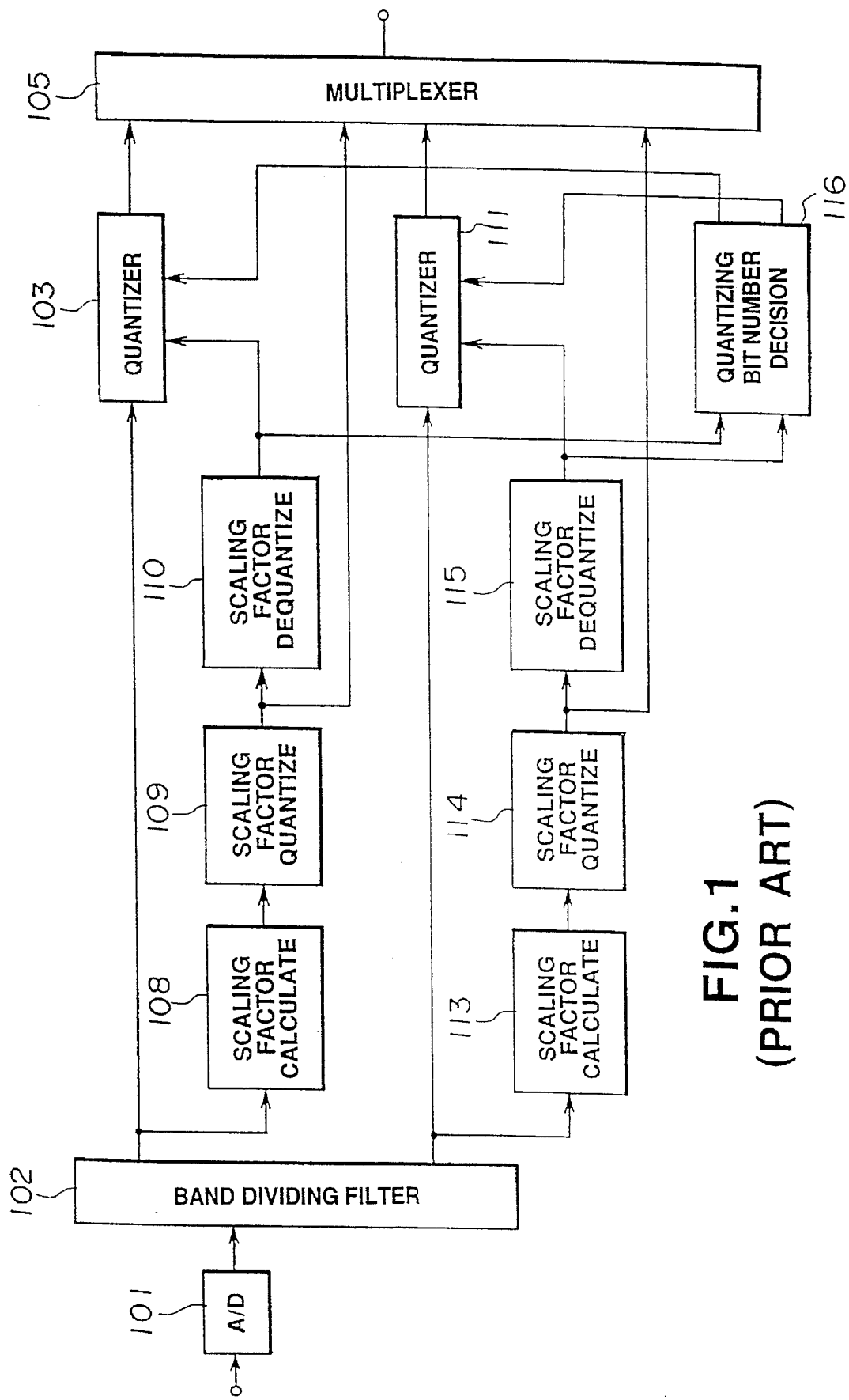
FIG. 1 is a block circuit diagram showing an example of a conventional encoder employing equal length coding.
Figure 2:
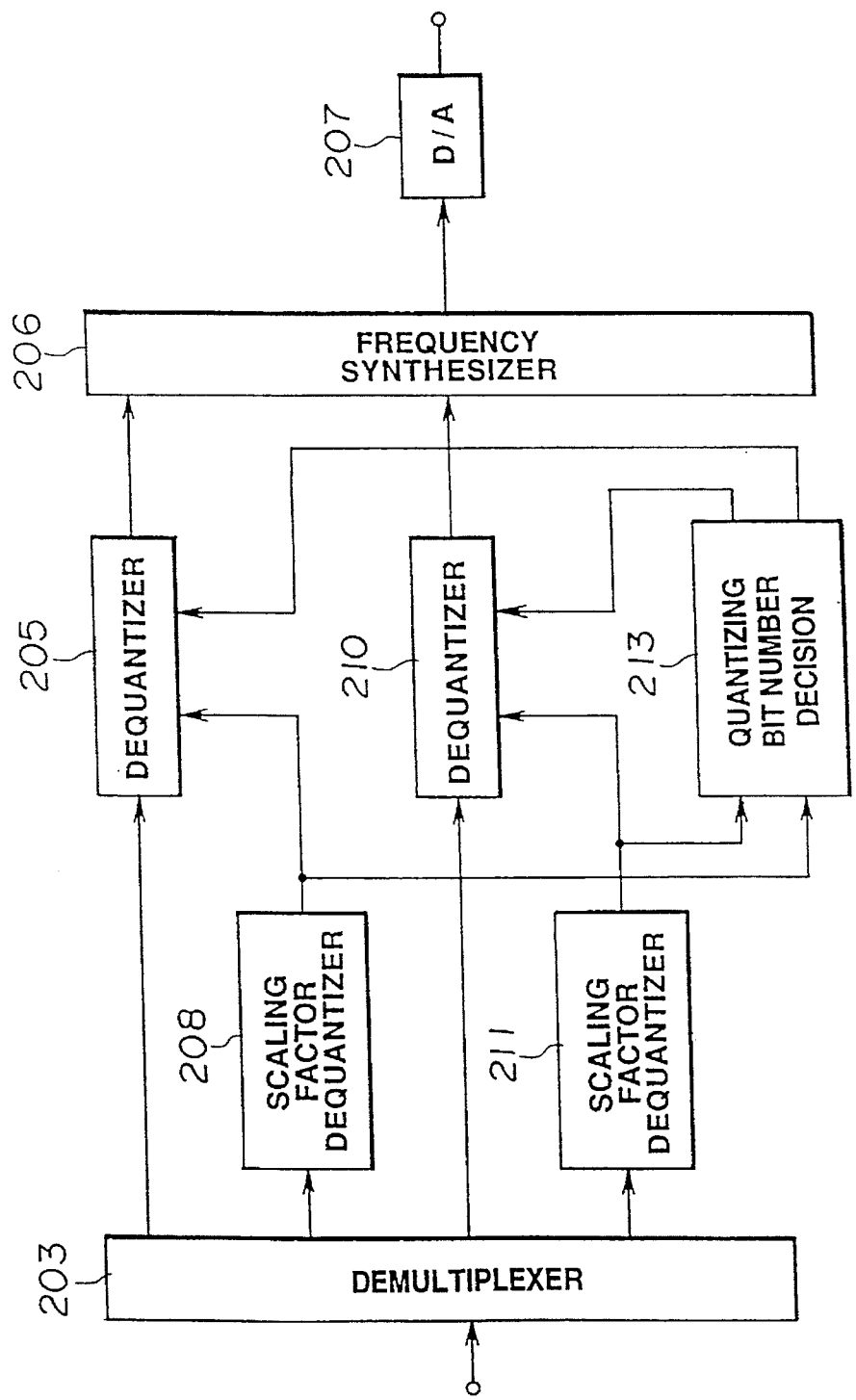
FIG. 2 is a block circuit diagram showing an example of a conventional decoder for an equal length coded compressed digital signal.

The recording apparatus shown in FIG. 11 incorporates the encoder shown in FIG. 5. Alternatively, a recording apparatus according to the invention could incorporate one of the encoders shown in FIGS. 1, 3, and 7.

In the apparatus shown in FIG. 11, the multiplexer 505 feeds a record signal into the writing circuit 506. The writing circuit writes the record signal received from the multiplexer 505 into the semiconductor memory card 507 in response to a write control signal generated by the write control circuit 527.

The total number of bits required to code each frame of the frequency range signals using the coding (equal length or unequal length) selected by the decision circuit 520 is supplied from the decision circuit 520 to the write control circuit 527. The write control circuit 527 feeds a write control signal into the writing circuit 506. The write control signal depends on the number of bits in each frame of the record signal. The write control signal causes the writing circuit 506 to write each frame received from the multiplexer into the semiconductor memory such that the bit rate at which the frame is written (i.e., the number of bits per second) into the semiconductor memory depends on the number of bits in the frame.

Alternatively, the write circuit 506 writes each frame into the semiconductor memory card 507 with a fixed, relatively high, bit rate. To accommodate the variations in the number of bits in each frame received from the multiplexer 505, the write control signal controls the writing time during which writing into the semiconductor memory card takes place.

Since the construction and operation of the embodiment of FIG. 11 is otherwise the same as that of the encoder shown in FIG. 5, and the same components in the drawings are indicated by the same numerals, the corresponding description is omitted for brevity.

Writing into the semiconductor memory card 507 by controlling the writing bit rate or by writing intermittently at a fixed, relatively high, bit rate in response to the number of bits in each frame, unequal length frames may be recorded without using a buffer. Eliminating the buffer means that countermeasures against buffer overflow or underflow may be dispensed with. Eliminating the buffer reduces hardware complexity. Moreover, the performance of the apparatus is not compromised by having to change the scaling factors to prevent buffer overflow or underflow.

FIG. 12 shows a reproducer according to the invention. In the reproducer, the readout circuit 602 reads part of the compressed digital signal from the semiconductor memory card at a fixed bit rate. This data is passed to the demultiplexer 603 which extracts the data indicating the number of bits in a frame of the compressed digital signal. The data indicating the number of bits in the frame is supplied to the readout control circuit 612. The readout control circuit 612 provides a read control signal indicating the number of bits in the frame to the readout circuit 602. The readout circuit reads the frame from the semiconductor memory card at a bit rate that depends on the read control signal.

Alternatively, the readout circuit 602 reads the frame out of the semiconductor memory card at a fixed, relatively high bit rate. To accommodate the variations in the numbers of bits in each frame read from the semiconductor memory card, the read control signal controls the reading time, during which reading from the semiconductor memory card takes place.

In response to the read control signal, the readout circuit 602 reads out the compressed digital signal from the semiconductor memory card 601 to the demultiplexer 603. The demultiplexer extracts from the compressed digital signal each frame of the coded frequency range signals, and the quantized scaling factors, and at least one decision signal for the frame.

Since the construction and operation of the embodiment of FIG. 12 is otherwise the same as that of the embodiment of the signal reproducing apparatus shown in FIG. 6, and the same components in the drawings are indicated by the same numerals, the corresponding description is omitted for brevity.

Reading from the semiconductor memory card 602 by controlling the reading bit rate, or by reading intermittently at a fixed, relatively high, bit rate, in response to the number of bits in each frame, unequal length frames may be read without using a buffer. Eliminating the buffer means that countermeasures against buffer overflow or underflow may be dispensed with. Eliminating the buffer also reduces hardware complexity. Moreover, the performance of the apparatus is not compromised by having to change the scaling factors to avoid buffer overflow or underflow.

The present invention is not limited to the above-described embodiments. For example, the number of frequency ranges may be one, or three or more. The present invention may also be applied to any digital recording apparatus, to any digital reproducing apparatus, or to any digital recording and reproducing apparatus. The semiconductor memory, as the recording medium, is not limited to IC memory cards, but may be applied to memory cartridges or to memory packs as well. The present invention may be applied not only to recording and reproducing using a recording medium, but also to signal transmission using a transmission medium.

I claim:

1. An apparatus for compressing a digital input signal divided into frames to provide a recording signal for real-time recording on a recording medium capable of being recorded at a variable bit rate as a record medium, the apparatus comprising:

quantizing means for coding a frame of the digital input signal to provide a coded frame including a predetermined number of bits;

variable length coding means for coding the frame of the digital input signal to provide a coded frame including a variable number of bits;

comparator means for comparing the variable number of bits with the predetermined number of bits, and for providing a decision signal having a first state and a second state, the decision signal being in the first state when the variable number of bits is greater than the predetermined number of bits, and being in the second state when the variable number of bits is less than the predetermined number of bits, the comparator means receiving data indicating the variable number of bits from the variable length coding means;

selecting means for including the coded frame including the predetermined number of bits in the recording signal when the decision signal is in the first state, and for including the coded frame including the variable number of bits in the recording signal when the decision signal is in the second state, wherein the selecting means provides a recording signal comprising a plurality of frames, each frame including a number of bits, the number of bits in each frame being variable;

a write control means for generating a write control signal in response to the number of bits in a frame of the recording signal; and a writing means for receiving the frame of the recording signal from the selecting means and for writing the frame of the recording signal into the recording medium at a variable bit rate determined by the write control signal according to the number of bits in the frame.

2. An apparatus for compressing a digital input signal divided into frames to provide a recording signal for real-time recording on a recording medium, the apparatus comprising:

quantizing means for coding a frame of the digital input signal to provide a coded frame including a predetermined number of bits;

variable length coding means for coding the frame of the digital input signal to provide a coded frame including a variable number of bits;

comparator means for comparing the variable number of bits with the predetermined number of bits, and for providing a decision signal having a first state and a second state, the decision signal being in the first state when the variable number of bits is greater than the predetermined number of bits, and being in the second state when the variable number of bits is less than the predetermined number of bits, the comparator means receiving data indicating the variable number of bits from the variable length coding means;

selecting means for including the coded frame including the predetermined number of bits in the recording signal when the decision signal is in the first state, and for including the coded frame including the variable number of bits in the recording signal when the decision signal is in the second state, wherein the selecting means provides a recording signal comprising a plurality of frames, each frame including a number of bits, the number of bits in each frame being variable;

a write control means for generating a write control signal in response to the number of bits in a frame of the recording signal; and a writing means for receiving the frame of the recording signal from the selecting means and for writing the frame of the recording signal into the recording medium at a fixed bit rate for a writing time determined by the write control signal according to the number of bits in the frame.

3. An apparatus for compressing a digital input signal divided into frames to provide a recording signal for real-time recording on a recording medium capable of being written at a variable bit rate, the apparatus comprising;

quantizing means for coding a frame of the digital input signal to provide a coded frame including a predetermined number of bits;

variable length coding means for coding the frame of the digital input signal to provide a coded frame including a variable number of bits;

comparator means for comparing the variable number of bits with the predetermined number of bits, and for providing a decision signal having a first state and a second state, the decision signal being in the first state when the variable number of bits is greater than the predetermined number of bits, and being in the second state when the variable number of bits is less than the predetermined number of bits, the comparator means receiving data indicating the variable number of bits from the variable length coding means;

selecting means for including the coded frame including the predetermined number of bits in the recording signal when the decision signal is in the first state, and for including the coded frame including the variable number of bits in the recording signal when the decision signal is in the second state, wherein the selecting means provides a recording signal comprising a plurality of frames, each frame including a number of bits, the number of bits in each frame being variable;

a write control means for generating a write control signal in response to the number of bits in a frame of the recording signal;

a writing means for receiving the frame of the recording signal from the selecting means and for writing the frame of the recording signal into the recording medium at a variable bit rate determined by the write control signal according to the number of bits in the frame;

a frequency dividing means for dividing the digital input signal in frequency into plural frequency ranges, and for providing, for each frequency range, a frequency range signal divided into frames, each frame corresponding to a frame of the digital input signal; and a bit allocation decision means for determining, for each frame of the digital input signal, an allocation of the predetermined number of bits among the plural frequency ranges, wherein the quantizing means includes a frequency range fixed length coding means for fixed length coding a frame of the frequency range signal in each frequency range to provide a frame of a fixed length coded frequency range signal, the frames of the fixed length coded frequency range signals for all the frequency ranges together constituting a fixed length coded frame including the predetermined number of bits; and the variable length coding means includes a frequency range variable length coding means for variable length coding the frame of the frequency range signal in each frequency range to provide a frame of a variable length coded frequency range signal, the variable length coded frequency range signals for all the frequency ranges together constituting a variable length coded frame including a variable number of bits.

4. An apparatus for compressing a digital input signal divided into frames to provide a recording signal for real-time recording on a recording medium, the apparatus comprising:

quantizing means for coding a frame of the digital input signal to provide a coded frame including a predetermined number of bits;

variable length coding means for coding the frame of the digital input signal to provide a coded frame including a variable number of bits;

comparator means for comparing the variable number of bits with the predetermined number of bits, and for providing a decision signal having a first state and a second state, the decision signal being in the first state when the variable number of bits is greater than the predetermined number of bits, and being in the second state when the variable number of bits is less than the predetermined number of bits, the comparator means receiving data indicating the variable number of bits from the variable length coding means;

selecting means for including the coded frame including the predetermined number of bits in the recording signal when the decision signal is in the first state, and for including the coded frame including the variable number of bits in the recording signal when the decision signal is in the second state, wherein the selecting means provides a recording signal comprising a plurality of frames, each frame including a number of bits, the number of bits in each frame being variable;

a write control means for generating a write control signal in response to the number of bits in a frame of the recording signal;

a writing means for receiving the frame of the recording signal from the selecting means and for writing the frame of the recording signal into the recording medium at a fixed bit rate determined by the write control signal according to the number of bits in the frame;

a frequency dividing means for dividing the digital input signal in frequency into plural frequency ranges, and for providing, for each frequency range, a frequency range signal divided into frames, each frame corresponding to a frame of the digital input signal; and a bit allocation decision means for determining, for each frame of the digital input signal, an allocation of the predetermined number of bits among the plural frequency ranges, wherein the quantizing means includes a frequency range fixed length coding means for fixed length coding a frame of the frequency range signal in each frequency range to provide a frame of a fixed length coded frequency range signal, the frames of the fixed length coded frequency range signals for all the frequency ranges together constituting a fixed length coded frame including the predetermined number of bits; and the variable length coding means includes a frequency range variable length coding means for variable length coding the frame of the frequency range signal in each frequency range to provide a frame of a variable length coded frequency range signal, the variable length coded frequency range signals for all the frequency ranges together constituting a variable length coded frame including a variable number of bits.

5. An apparatus for compressing a digital input signal divided into frames to provide a recording signal for real-time recording on a recording medium capable of being written at a variable bit rate, the apparatus comprising:

a frequency dividing means for dividing the digital input signal in frequency into plural frequency ranges, and for providing, in each frequency range, a frequency range signal divided into frames corresponding to the frames of the digital input signal;

a bit allocation decision means for determining, for each frame of the digital input signal, an allocation of a predetermined number of bits among the frequency range signals;

a first coding means for fixed length coding a frame of the frequency range signal in each frequency range to provide a frame of a fixed length coded frequency range signal including a first number of bits;

a second coding means for variable length coding the frame of the frequency range signal in each frequency range to provide a frame of a variable length coded frequency range signal including a second number of bits;

comparator means for comparing, in each frequency range, the second number of bits with the first number of bits;

a selecting means, operating in response to the comparator means, for including in the recording signal the frame of the fixed length coded frequency range signal for each frequency range wherein the comparator means indicates that the first number of bits is greater than the second number of bits, and the frame of the variable length coded frequency range signal for each frequency range wherein the comparator means indicates that the first number of bits is less than the second number of bits, wherein the selecting means provides a recording signal comprising a plurality of frames, each frame including a number of bits, the number of bits in each frame being variable;

a write control means for generating a write control signal in response to the number of bits in a frame of the recording signal; and a writing means for receiving the frame of the recording signal from the selecting means and for writing the frame of the recording signal into the recording medium at a variable bit rate determined by the write control signal according to the number of bits in the frame.

6. An apparatus for compressing a digital input signal divided into frames to provide a recording signal for real-time recording on a recording medium, the apparatus comprising:

a frequency dividing means for dividing the digital input signal in frequency into plural frequency ranges, and for providing, in each frequency range, a frequency range signal divided into frames corresponding to the frames of the digital input signal;

a bit allocation decision means for determining, for each frame of the digital input signal, an allocation of a predetermined number of bits among the frequency range signals;

a first coding means for fixed length coding a frame of the frequency range signal in each frequency range to provide a frame of a fixed length coded frequency range signal including a first number of bits;

a second coding means for variable length coding the frame of the frequency range signal in each frequency range to provide a frame of a variable length coded frequency range signal including a second number of bits;

comparator means for comparing, in each frequency range, the second number of bits with the first number of bits;

a selecting means, operating in response to the comparator means, for including in the recording signal the frame of the fixed length coded frequency range signal for each frequency range wherein the comparator means indicates that the first number of bits is greater than the second number of bits, and the frame of the variable length coded frequency range signal for each frequency range wherein the comparator means indicates that the first number of bits is less than the second number of bits, wherein the selecting means provides a recording signal comprising a plurality of frames, each frame including a number of bits, the number of bits in each frame being variable;

a write control means for generating a write control signal in response to the number of bits in a frame of the recording signal; and a writing means for receiving the frame of the recording signal from the selecting means and for writing the frame of the recording signal into the recording medium at a fixed bit rate determined by the write control signal according to the number of bits in the frame.

7. A method for compressing a digital input signal divided into frames to provide a recording signal for real-time recording on a recording medium capable of being written at a variable bit rate, the method comprising the steps of:

providing a frame of the digital input signal;

fixed length coding the frame of the digital input signal to provide a fixed length coded frame including a predetermined number of bits;

variable length coding the frame of the digital input signal to provide a variable length coded frame including a variable number of bits;

comparing the variable number of bits with the predetermined number of bits to determine the greater of the variable number of bits and the predetermined number of bits;

including the fixed length coded frame in the recording signal when the variable number of bits is determined in the comparing step to be greater than the predetermined number of bits;

including the variable length coded frame in the recording signal when the variable number of bits is determined in the comparing step to be less than the predetermined number of bits, wherein the step of including the fixed length coded frame in the recording signal when the variable number of bits is determined in the comparing step to be greater than the predetermined number of bits and including the variable length coded frame in the recording signal when the variable number of bits is determined in the comparing step to be less than the predetermined number of bits provides a recording signal comprising a plurality of frames, each frame including a number of bits, the number of bits in each frame being variable;

providing a recording medium capable of being written at a variable bit rate;

generating a write control signal in response to the number of bits in a frame of the recording signal; and writing the frame of the recording signal into the recording medium at a variable bit rate determined by the write control signal according to the number of bits in the frame.

8. A method for compressing a digital input signal divided into frames to provide a recording signal for real-time recording on a recording medium, the method comprising the steps of:

providing a frame of the digital input signal;

fixed length coding the frame of the digital input signal to provide a fixed length coded frame including a predetermined number of bits;

variable length coding the frame of the digital input signal to provide a variable length coded frame including a variable number of bits;

comparing the variable number of bits with the predetermined number of bits to determine the greater of the variable number of bits and the predetermined number of bits;

including the fixed length coded frame in the recording signal when the variable number of bits is determined in the comparing step to be greater than the predetermined number of bits and including the variable length coded frame in the recording signal when the variable number of bits is determined in the comparing step to be less than the predetermined number of bits, wherein the step of including the fixed length coded frame in the recording signal when the variable number of bits is greater than the predetermined number of bits and including the variable length coded frame in the recording signal when the variable number of bits is less than the predetermined number of bits provides a recording signal comprising a plurality of frames, each frame including a number of bits, the number of bits in each frame being variable;

providing a recording medium;

generating a write control signal in response to the number of bits in a frame of the recording signal; and writing the recording signal into the recording medium at a fixed bit rate for a writing time determined by the write control signal according to the number of bits in the frame.

9. A method for compressing a digital input signal divided into frames to provide a recording signal for real-time recording on a recording medium capable of being written at a variable bit rate, the method comprising the steps of:

providing a predetermined number of bits;

dividing the digital input signal in frequency into plural frequency ranges, and providing, in each frequency range, a frequency range signal divided into frames corresponding to the frames of the digital input signal;

determining, for each frame of the digital input signal, an allocation of the predetermined number of bits among the frequency range signals;

fixed length coding a frame of the frequency range signal in each frequency range to provide a frame of a fixed length coded frequency range signal including a first number of bits;

variable length coding the frame of the frequency range signal in each frequency range to provide a frame of a variable length coded frequency range signal including a second number of bits;

comparing the first number of bits with the second number of bits to provide a comparison result, and in response to the comparison result, including in the recording signal the frame of the fixed length coded frequency range signal for each frequency range wherein the comparison result indicates that the first number of bits is greater than the second number of bits, and the frame of the variable length coded frequency range signal for each frequency range wherein the comparison result indicates that the first number of bits is less than the second number of bits, wherein the step of including the fixed length coded frame in the recording signal when the comparison result indicates that the variable number of bits is greater than the predetermined number of bits and including the variable length coded frame in the recording signal when the comparison result indicates that the variable number of bits is less than the predetermined number of bits provides a recording signal comprising a plurality of frames, each frame including a number of bits, the number of bits in each frame being variable;

providing a recording medium capable of being written at a variable bit rate;

generating a write control signal in response to the number of bits in a frame of the recording signal; and writing the frame of the recording signal into the recording medium at a variable bit rate determined by the write control signal according to the number of bits in the frame.

10. A method for compressing a digital input signal divided into frames to provide a recording signal for real-time recording on a record medium, the method comprising the steps of:

providing a predetermined number of bits;

dividing the digital input signal in frequency into plural frequency ranges, and providing, in each frequency range, a frequency range signal divided into frames corresponding to the frames of the digital input signal;

determining, for each frame of the digital input signal, an allocation of the predetermined number of bits among the frequency range signals;

fixed length coding a frame of the frequency range signal in each frequency range to provide a frame of a fixed length coded frequency range signal including a first number of bits;

variable length coding the frame of the frequency range signal in each frequency range to provide a frame of a variable length coded frequency range signal including a second number of bits;

comparing the first number of bits with the second number of bits to provide a comparison result, and in response to the comparison result, including in the recording signal the frame of the fixed length coded frequency range signal for each frequency range wherein the comparison result indicates that the first number of bits is greater than the second number of bits, and the frame of the variable length coded frequency range signal for each frequency range wherein the comparison result indicates that the first number of bits is less than the second number of bits, wherein the step of including the fixed length coded frame in the recording signal when the comparison result indicates that the variable number of bits is greater than the predetermined number of bits and including the variable length coded frame in the recording signal when the comparison result indicates that the variable number of bits is less than the predetermined number of bits provides a recording signal comprising a plurality of frames, each frame including a number of bits, the number of bits in each frame being variable;

providing a recording medium;

generating a write control signal in response to the number of bits in a frame of the recording signal; and writing the frame of the recording signal into the recording medium at a fixed bit rate for a writing time determined by the write control signal according to the number of bits in the frame.

\* \* \* \* \*